United States Patent Office 3,450,697
Patented June 17, 1969

3,450,697
PROCESS FOR THE PREPARATION OF
5(10),7-DEHYDRO-STEROIDS
Ann Gale, London, and Gordon Hanley Phillipps, Greenford, England, assignors to Glaxo Laboratories Limited, Greenford, Middlesex, England, a British company
No Drawing. Filed June 21, 1966, Ser. No. 559,074
Claims priority, application Great Britain, June 22, 1965, 26,388/65
Int. Cl. C07c 167/12, 169/10, 173/00
U.S. Cl. 260—239.55
15 Claims

ABSTRACT OF THE DISCLOSURE

5(10), 7-dehydro-steroids useful as intermediates in the preparation of equilin and related steroids having hormonal activity are prepared by reacting a 5(10),6,8(9)-dehydro-steroid with a metal/ammonia reducing system in the presence of a substance liberating protons in liquid ammonia. The reducing system is preferably an alkali metal or alkaline earth metal, particularly lithium, in liquid ammonia, and the substance providing protons is conveniently an alcohol, preferably a teritary aliphatic alcohol such as t-butanol.

This invention relates to a novel process for the production of 5(10),7-dehydro-steroids.

A number of 5(10),7-dehydro-steroids have proved to be useful as intermediates in the production of equilin and related steroids having hormonal activity. Equilin itself possesses oestrogenic activity and it is desirable to provide a method for its preparation from more readily available steroids and, in particular, for a generally applicable process capable of yielding related compounds possessing different substituents. Copending U.S. application Ser. No. 559,066, filed June 21, 1966 describes the preparation of equilin and related compounds from 2,5(10),7-dehydro-steroid 3-ethers having a 9α-hydrogen atom. It is an object of the present invention to provide a process for the production of such 5(10),7-dehydro-steroids from more readily available compounds such as equilenin.

According to the present invention we provide a process for the preparation of 5(10),7-dehydro-steroids having the structure

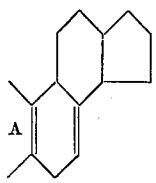

(I)

where A represents a divalent grouping of the structure

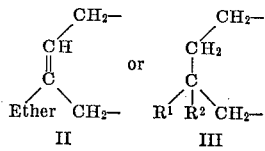
II      III (where $R^1$ is hydrogen and $R^2$ is hydrogen or an ether group or $R^1$ and $R^2$ together represent a protected keto group and ether represent san ether group); wherein a 5(10),6,8(9)-dehydro-steroid of the structure

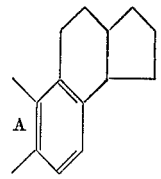

(IV)

(where B represents a divalent grouping of the structure

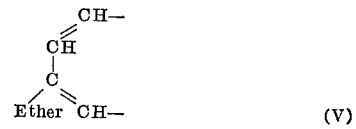

(V)

or the structure II or III above) is reacted with a metal/ammonia reducing system in the presence of a substance liberating protons in liquid ammonia.

Numerous attempts have been made to reduce the A and B rings of equilenin and related compounds for various purposes but no reduction of 5(10),6,8,(9)-dehydro-steroids to give related 5(10),7-dehydro-steroids has ever been described in the literature. The fact that according to the present process, 5(10),7-dehydro-steroids are produced with the required 9α-hydrogen atom is especially advantageous since the required equilin derivatives can then be prepared by subsequent treatment with a brominating agent followed by dehydrobromination (usually spontaneous) as described in application Ser. No. 559,066.

The metal/ammonia reducing system is preferably an alkali metal or alkaline earth metal in liquid ammonia, lithium being the preferred metal.

The substance providing protons in liquid ammonia, that is a substance acting as an acid in such a system, is conveniently an alcohol, preferably a tertiary aliphatic alcohol such as t-butanol.

A solvent for the steroid may be present, conveniently a cyclic or acyclic ether solvent such as diethyl ether, tetrahydrofuran, dioxan etc.

The reaction time will in general be of the order of 2 to 5 hours.

The steroids used as starting material may carry varying substituents in the C and D rings and, for example, may possess a 17-oxo group, a protected 17-oxo group such as a ketal group, or a 17-hydroxy or 17-acyloxy group or a 17-acyl, 17-acetoxy-acetyl, 17-aliphatic or 17-araliphatic group in the presence or absence of a 17-hydroxy or 17-acyloxy group. The 17-acyloxy group may, for example be a lower aliphatic acyloxy group having 1–5 carbon atoms e.g. a propionyloxy or acetoxy group. The 17-aliphatic group may, for example, be a methyl, ethyl, 5,6-dimethyl-hept-3-en-2-yl, ethynyl, chloroethynyl group etc. An alkynyl group at the 17α-position for example the ethynyl group, may be reduced by the metal-amine reagent to an alkyl group and a 17β-hydroxy group with such a 17α-alkynyl group may eliminate to yield an alkenyl group. The 13-position may carry an alkyl group which preferably has 1–5 carbon atoms and may, for example be a methyl, ethyl or propyl group. Any groups which would be reduced by the metal/ammonia system can, if desirable, be protected before the reduction stage. Thus, for example, reducible oxo groups may be reacted with conventional protecting reagents, e.g. glycols etc.

The ether groups at the 3-position may, for example, alkyl group which preferably has 1–5 carbon atoms and example, methoxy or ethoxy groups, or cycloalkoxy groups such as cyclopentyloxy groups or, it may be more convenient to use a group which can readily be removed. Thus, for example, one can use the tetrahydropyranyl ether.

5(10),6,8(9)-steroids having a hydroxy group in the 3-position (e.g. equilenin) can be converted prior to reduction into their 3-ethers e.g. by conventional etherification reactions, for example by reacting a halide, sulphate or p-toluene sulphonate of the etherifying radical with an alkali metal derivative of the 3-hydroxy compound. Tetrahydropyranyl ethers can be prepared by reacting the 3-hydroxy compound with dihydropyran in an inert solvent such as benzene, toluene, tetrahydrofuran etc. in the presence of an acid catalyst, for example phosphorus oxychloride.

Starting compounds having the structure IV with B having structure V can be obtained by the process as described in copending United States application Ser. No. 559,091, filed June 21, 1966. A number of such compounds, including particularly some of the equilenin 3-ethers are known compounds. These compounds yield, on reduction according to the invention, steroids of structure I with A having the structure II and such products are especially useful in the production of the oestrogenic hormone equilin and closely related compounds.

Starting compounds having the structure IV with B having the structure II can be obtained from the corresponding compounds in which B has the structure V by reduction with sodium in liquid ammonia. This reduction also produces a significant proportion of the desired substance of structure I with A having structure II but a useful yield of the structure IV with B having structure II compound can be obtained simultaneously and recovered by separation. Compounds having the structure IV with B having the structure II yield, on reduction according to the invention, compounds having the structure I with A having the structure II.

Starting compounds having the structure IV with B having the structure III with $R^1$ and $R^2$ constituting a ketone protecting group can be obtained from the corresponding compounds of structure IV with B having the structure II by conversion of the enol ether grouping to a protected ketone grouping. Thus, for example, reaction with an alcohol in the presence of an acid catalyst, for example a mineral acid such as hydrogen chloride or an organic acid such as oxalic or p-toluene sulphonic acid yields a ketal grouping. The ketone protecting group must, of course, remain un-reduced by the metal shield ammonia reagent and is preferably a ketal group, for example an ethylene ketal, 1,2-propylene ketal or dimethyl ketal grouping etc. Where starting compounds are required of structure IV with B having the structure III with $R^1$ being hydrogen and $R^2$ being an ether group, these can be obtained by reduction of the corresponding compounds where B has structure II, for example by catalytic hydrogenation e.g. using palladium or platinum as catalyst.

Starting compounds of structure IV with B having structure III with both $R^1$ and $R^2$ being hydrogen, may be prepared from the corresponding compounds of structure IV and B having the structure V by reduction with potassium in liquid ammonia whereby a fraction can be isolated having the structure which is required.

In order that the invention may be well understood we give the following examples by way of illustration only.

EXAMPLE 1.—3-METHOXYOESTRA-2,5(10),7-TRIEN-17β-OL

Ammonia (600 ml.) was distilled from sodium into a stirred solution of equilenin methyl ether (6.27 g.) in dry tetrahydrofuran (200 ml.) and t-butanol (150 ml.). Lithium (6.58 g.), in small pieces, was added during 30 min. to the stirred reaction mixture, and after 4 hr. the excess of lithium was destroyed by the addition of ethanol (300 ml.). The ammonia was allowed to evaporate overnight and the resultant suspension was evaporated to dryness in vacuo. The residue was shaken with ether and water, and the aqueous layer was extracted twice with ether. The combined ethereal extracts were washed to neutrality with water and the dried (MgSO$_4$) solution was evaporated in vacuo to leave a solid (6.85 g.). This was crystallised from ether to give the trienol (2.89 g.), which from vapour phase chromatography was >95% pure. Further crystallisation, first from ether, then from ethanol gave 3-methoxyoestra-2,5(10),7-trien-17β-ol as an ethanol solvate, M.P. 176–178° (evacuated capillary), [α]$_D$+176° (c., 1.1 in CHCl$_3$).

EXAMPLE 2.—3-METHOXYOESTRA-2,5(10),7-TRIEN-17β-OL

Ammonia (500 ml.) was distilled from sodium into a stirred solution of 3-methoxyoestra-1,3,5(10),6,8-pentaen-17β-ol (prepared by the method of Bachmann and Drieding, J. Amer. Chem. Soc., 1950, 72, 1323) (5.23 g.) in dry tetrahydrofuran (165 ml.) and t-butanol (125 ml.). Lithium (5.41 g.), in small pieces, was added slowly and after 4 hrs. the excess of lithium was destroyed by addition of ethanol (250 ml.). The ammonia was allowed to evaporate overnight and the resultant suspension was evaporated to dryness in vacuo. The residue was shaken with ether and water and the aqueous layer was extracted twice with ether. The combined ethereal extracts was washed to neutrality with water and the dried (MgSO$_4$) solution was evaporated in vacuo to leave a solid (5.4 g.). This was crystallised from ether to give 3 - methoxyoestra-2,5(10),7-trien-17β-ol (2.19 g.), M.P. 157–165° (evacuated capillary).

EXAMPLE 3.—3-METHOXY-17α-METHYLOESTRA-2,5-(10),7-TRIEN-17β-OL

Ammonia (25 ml.) was distilled from sodium into a stirred solution of 3-methoxy-17α-methyloestra-1,3,5(10), 6,8-pentaen-17β-ol (prepared by the method of Cohen, Cook, and Hewett, J. Chem. Soc., 1935, 445) (252 mg.) in dry tetrahydrofuran (8.2 ml.) and t-butanol (6.2 ml.) and lithium (284 mg.) was added portionwise. After 4.5 hrs. ethanol (15 ml.) was added to destroy the excess of lithium and the ammonia was allowed to evaporate overnight. The resultant suspension was evaporated to dryness in vacuo and the residue was shaken with ether and water. The aqueous layer was extracted twice with ether and the combined ethereal extracts were washed with water. The dried (MgSO$_4$) extract was evaporated in vacuo to leave a solid (244 mg.). This (210 mg.) was recrystallised from ether to give 3-methoxy-17α-methyloestra-2,5 (10),7-trien-17β-ol (88 mg.), M.P. 162–170° (evacuated capillary). Found: C, 80.0%; H, 9.5%. Calc. for $C_{20}H_{28}O_2$: C, 79.95%; H, 9.4%.

EXAMPLE 4.—3-METHOXYOESTRA-2,5(10),7-TRIEN-17-ONE 17-ETHYLENE KETAL

Ammonia (25 ml.) was distilled from sodium into a stirred solution of 3-methoxyoestra-1,3,5(10),6,8-pentaen-17-one 17-ethylene ketal (prepared by the method of Buzby et al., J. Med. Chem., 1964, 7, 755) (265 mg.) in dry tetrahydrofuran (8.2 ml.) and t-butanol (6.2 ml.) and lithium (344 mg.) was added portionwise. After 4.5 hr. ethanol (20 ml.) was added to destroy the excess of lithium and the ammonia was allowed to evaporate overnight. The resultant suspension was evaporated to dryness in vacuo and the residue was shaken with ether and water. The aqueous layer was extracted twice with ether and the combined ethereal extracts were washed with water. The dried (MgSO$_4$) extract was evaporated in vacuo to leave a solid (249 mg.), part of which (138 mg.) was recrystallised from ether to give 3-methoxyoestra-2,5(10),7-trien-17-one 17-ethylene ketal (54 mg.), M.P. 166–170° (evacuated capillary), [α]$_D$+110° (c., 0.7 in CHCl$_3$). Found: C, 76.6%; H, 8.8%. C$_{21}$H$_{28}$O$_3$ requires C, 76.8%; H, 8.6%.

EXAMPLE 5.—THE PREPARATION OF 3-CYCLOPENTYLOXY - OESTRA - 2,5(10),7-TRIEN-17β-OL- FROM EQUILENIN (a) Equilenin cyclopentyl ether A mixture of equilenin (2.05 g.), potassium hydroxide (0.496 g.), cyclopentyl bromide (1.05 ml.), and ethanol (60 ml.) was boiled under reflux. Two further aliquots of reagents were added at hourly intervals and when the reaction had been boiled for a total of 4 hours it was concentrated and cooled. The crystals were filtered off and recrystallised from methanol to yield equilenin cyclopentyl ether (2.05 g.) having M.P. 178–180°, [α]$_D$ +72° λ$_{max.}$ (in EtOH) 235, 269, 279, 290, 325, 340 mμ (ε=61,800; 5340; 5600; 3630; 2120; 2630). (Found: C, 82.7%; H, 7.9%. C$_{23}$H$_{26}$O$_2$ requires C, 82.6%; H, 7.8%).

(b) 3-cyclopentyloxyoestra-1,3,5(10),6,8-pentaen-17β-ol

A mixture of equilenin cyclopentyl ether (12.01 g.), sodium borohydride (4.2 g.), sodium methoxide (from 0.6 g. Na), dioxan (50 ml.) and methanol (160 ml.) was boiled under reflux for 1½ hours. The mixture was cooled and water was added. The steroid was extracted with ethyl acetate and the extracts were washed with water and evaporated. The residue was crystallised from acetone/hexane to give the 17β-hydroxy-compound, M.P. 133–134°, [α]$_D$ +32.7° λ$_{max.}$ (in EtOH) 233, 269, 280, 291, 325, 339 mμ (ε=65,500; 5,170; 5,500; 3,530; 2,120; 2.620).

(c) 3-cyclopentyloxyoestra-2,5(10),7-trien-17β-ol (i) By reduction of 3-cyclopentyloxyoestra-1,3,5(10),6,8-pentaen-17β-ol.—Ammonia (1 l.) was distilled into a stirred solution of 3-cyclopentyloxyoestra-1,3,5(10),6,8-pentaen-17β-ol (9.33 g.) in dry tetrahydrofuran (310 ml.) and t-butanol (270 ml.), and lithium (9 g.) was added in pieces. After 4 hours, ethanol (250 ml.) was added and the ammonia was distilled off. Water (600 ml.) was added and the solvents were distilled off under reduced pressure. The crystals were filtered off and recrystallised from methanol to give solvated 3-cyclopentyloxyoestra-2,5(10), 7-trien-17β-ol (5.63 g.) containing ¼ mole of methanol. It showed M.P. 86°, [α]$_D$ +146.5° (in dioxan). (Found: C, 80.3%; H, 9.7%. C$_{23}$H$_{32}$O$_2$·¼CH$_3$OH requires C, 80.1%; H, 9.5%).

(ii) By direct reduction of equilenin cyclopentyl ether.—Ammonia (600 ml.) was distilled into a solution of equilenin cyclopentyl ether (13.5 g.) in dry tetrahydrofuran (310 ml.) and t-butanol (200 ml.). Lithium (13.5 g.) was added in pieces and the mixture was stirred for 4 hours. Ethanol (500 ml.) was added and the ammonia was evaporated. Water (1 l.) was added and the organic solvents were distilled off under reduced pressure. The steroid was extracted into ether and the extracts were washed, dried, and evaporated. The residue was crystallised from methanol to yield a solvate of 3-cyclopentyloxyoestra-2,5(10),7-trien-17β-ol (7.27 g.) having a M.P. 77–79°, [α]$_D$ +130° (in dioxan). I.R. and P.M.R. spectroscopy and thin layer chromatography showed this to be identical with the previous product.

EXAMPLE 6. — 3 - METHOXYOESTRA - 2,5(10),7-TRIEN - 17β - OL FROM 3-METHOXYOESTRA 2,5 (10),6,8-TETRAEN-17β-OL

A solution of 3-methoxyoestra-2,5(10),6,8-tetraen-17β-ol (1.8 g.) in dry tetrahydrofuran (70 ml.) and t-butanol (60 ml.) was added to ammonia (170 ml.) that had been distilled from sodium. Lithium (1.79 g.) was added in pieces and the mixture was stirred for 4 hours and ethanol (100 ml.) was added. The ammonia was evaporated in a stream of nitrogen and water (100 ml.) was added. The solvents were removed under reduced pressure and the solid was filtered off. Crystallisation from methanol gave 3-methoxyoestra-2,5(10),7-trien-17β-ol (0.56 g.) having M.P. 179–184°, [α]$_D$ +182° (in dioxan).

EXAMPLE 7.—19-NORPREGNA-5(10),6,8,TRANS-17 (20)-TETRAENE FROM EQUILENIN METHYL ETHER (a) 17α-ethynyl-3-methoxyoestra-1,3,5(10), 6,8-pentaen-17β-ol A saturated solution of equilenin methyl ether (5.25 g.) in 1:1 ether/benzene was added slowly to a suspension of sodium acetylide (from 5.5 g. sodium) in ammonia (ca. 1 l.). The mixture was stirred for 2 days and then ammonium chloride (11 g.) was added. The ammonia was evaporated and water was added. The steroid was extracted into ethyl acetate and the extracts were washed, dried and evaporated. The residue was crystallised from methanol to give the ethynyl carbinol (4.48 g.) having M.P. 196–198°, [α]$_D$ −105° (in CHCl$_3$). λ$_{max.}$ (in EtOH) 230, 259, 268, 278, 289, 325, 339 mμ (ε=66,000; 3670; 4890; 5300; 3550; 2290; 2890). (Found: C, 82.45%; H, 7.3%. C$_{21}$H$_{22}$O$_2$ requires C, 82.3%; H, 7.25%).

(b) 19-norpregna-5(10),6,8,trans-17(20-tetraene

A solution of 17α-ethynyl-3-methoxyoestra-1,3,5(10), 6,8-pentaen-17β-ol (2.03 g.) in tetrahydrofuran (60 ml.) was added to 30% excess ethereal methyl lithium and the mixture was boiled under reflux for 15 mins. Ammonia (200 ml.) was distilled into the mixture and lithium (2.6 g.) was added in pieces. The mixture was stirred for 3 hours and then t-butanol (60 ml.) was added. Ten minutes later, ethanol (100 ml.) was added and the ammonia was evaporated. Water (200 ml.) was added and the solvents were distilled off in vacuo. The steroid was extracted with ethyl acetate and the extracts were washed, dried, and evaporated. The residual oil was crystallised by scratching and was recrystallised from ethyl acetate/methanol to yield 19-norpregna-5(10),6,8-trans-17(20)-tetraene (0.56 g.), having M.P. 51–53°, [α]$_D$ +10° (in dioxan). λ$_{max.}$ 270, 279 mμ (ε=396, 302). (Found: C, 90.1%; H, 9.7%. C$_{20}$H$_{26}$ requires C, 90.15%; H, 9.85%).

EXAMPLE 8.—17αETHYL - 3-METHOXY-OESTRA-2,5(10),7-TRIEN-17β-OL AND 3-METHOXY-19-NORPREGNA-2,5(10),7-TRANS 17(20) - TETRAENE

A solution of 17α-ethynyl-3-methoxy-oestra-1,3,5(10), 6,8-pentaen-17β-ol (4.67 g.) in tetrahydrofuran (170 ml.) and t-butanol (150 ml.) was added to a suspension of lithium amide (from 0.7 g. lithium) in ammonia (500 ml.) and the mixture was stirred for 1 hour. Lithium (7.5 g.) was added in pieces and after 4 hours, ethanol (380 ml.) was added. The ammonia was evaporated and water (500 ml.) was added. The solvents were distilled off under reduced pressure and the steroid was extracted with ether. The steroid was purified by column chromatography on neutral alumina (grade 2), preparative thin-layer chromatography and by crystallisation from methanol to give two products: 17α-ethyl-3-methoxy-oestra-2,5 (10),7-trien-17β-ol having M.P. 109–112°, and 3-methoxy-19-norpregna-2,5(10),7-trans 17(20)-tetraene having M.P. 117–121°.

EXAMPLE 9.—3-METHOXYOESTRA-2,5(10),7-TRIEN-17β-OL

Ammonia (25 ml.) was distilled from sodium into a stirred suspension of 3-methoxyoestra-1,3,5(10),6,8-pentaen-17-one (258 mg.) in t-butanol (20 ml.). Lithium (277 mg.) was added portionwise to the resultant solution and the reaction mixture was stirred for 4½ hours. Ethanol (25 ml.) was added and the reaction mixture was evaporated to dryness. The solid residue was partitioned between ether and water and the ether extract was washed with water, dried, and evaporated to give crude 3-methoxyoestra-2,5(10),7-trien-17β-ol (286 mg.), which showed thin-layer chromatographic behaviour and infrared and proton magnetic resonance spectra resembling those of a pure sample. Gas-liquid chromatography, using siliconised celite, showed a peak of retention time (16 min.) the same as a standard sample, but other peaks were present and the purity of the sample was estimated at 70%.

EXAMPLE 10.—17β-HYDROXYOESTRA 5(10),6,8-TRIEN-3-ONE 3-ETHYLENE KETAL 3-methoxyoestra-2,5(10),6,8-tetraen-17β-ol (1 g.) in ethylene glycol (10 ml.) was treated with a solution of oxalic acid (100 mg.) in ethylene glycol (10 ml.) and anhydrous calcium sulphate (2 g.), and the suspension was allowed to stand at room temperature under nitrogen for 2 hours. The calcium sulphate was removed by filtration and the solution was poured into 2 N sodium bicarbonate and the product was extracted into ether. The extract was washed with water, dried over $MgSO_4$, and evaporated in vacuo. The residue crystallised from ether to give 17β-hydroxyoestra-5(10),6,8-trien-3-one 3-ethylene ketal (700 mg.), M.P. 126–129°, $[\alpha]_D$ +33° (c., 0.5 in dioxan). Found: C, 76.7%; H, 8.3%. $C_{20}H_{26}O_3$ requires C, 76.4%; H, 8.3%.

EXAMPLE 11.—PREPARATION OF 17β-HYDROXYOESTRA-5(10),7-DIEN-3-ONE 3-ETHYLENE KETAL AND 17β-HYDROXYOESTR-5(10)-EN-3-ONE 3-ETHYLENE KETAL FROM 17β-HYDROXY OESTRA-5-(10),6,8-TRIEN-3-ONE 3-ETHLENE KETAL

Ammonia (ca. 20 ml.) was distilled from sodium into a flask fitted with a condenser and a solution of 17β-hydroxyoestra-5(10),6,8-trien-3-one 3-ethylene ketal (200 mg.) in dry tetrahydrofuran (6 ml.) and dry t-butanol (5 ml.) was added. Lithium (200 mg.) was added in small pieces over 15 minutes. The reaction mixture was stirred for 4 hrs., ethanol (5 ml.) was added and the ammonia was allowed to evaporate off under nitrogen. Water was added and the product was isolated with ether as a white froth, which from its proton magnetic resonance spectrum contained 17-β-hydroxyoestra-5(10),7-dien-3-one 3-ethylene ketal (ca. 60%), 17β-hydroxyoestra-5-(10)-en-3-one 3-ethylene ketal (ca. 20%), and starting material (ca. 10%). Crystallisation from ether gave 17β-hydroxyoestra-5(10), 7-dien-3-one 3-ethylene ketal (53 mg.), M.P. 144–149°, $[\alpha]_D$ +158° (c., 0.3 in dioxan), with infrared and proton magnetic resonance spectra resembling those of an authentic sample.

EXAMPLE 12.—3-METHOXYOESTRA-2,5(10),6,8-TETRAEN-17β-OL

Ammonia (ca. 330 ml.) was distilled from sodium into a stirred solution of 3-methoxyoestra-1,3,5(10),6,8-pentaen-17β-ol (8.86 g.) in dry tetrohydrofuran (133 ml.) and dry t-butanol (133 ml.) Sodium (2.9 g.) was added in pieces and after 5 minutes a further 1.9 g. was added. The mixture was stirred for 15 min. and then methanol (46 ml.) was added. The ammonia was evaporated, water (250 ml.) was added, and the organic solvents were distilled off under reduced pressure. The steroid was filtered off and recrystallised repeatedly from ether to give 3-methoxyoestra-2,5(10),6,8-tetraen-17β-ol (4.52 g.), M.P. 143.5–145°, $[\alpha]_D$ +37.3° (in benzene), $\lambda_{max.}$ (in EtOH) 269, 278 mμ (ε 312, 256).

EXAMPLE 13.—3-METHOXYOESTRA-2,5(10),6,8-TETRAEN-17β-OL AND 3-METHOXYOESTRA-2,5(10),7-TRIEN-17β-OL

Ammonia (ca. 25 ml.) was distilled from sodium into a solution of equilenin methyl ether (259 mg.) in tetrahydrofuran (8.2 ml.) and t-butanol (6.2 ml.), and sodium (890 mg.) was added in portions. After 2.5 hrs. ethanol (30 ml.) was added. The ammonia was allowed to evaporate off and the mixture was concentrated in vacuo. The residue was partitioned between water and ether and the ether layer was washed and concentrated to dryness in vacuo to leave a crystalline solid (268 mg.), when on gas-liquid chromatography showed multiple peaks, two of which corresponded to 3-methoxyoestra-2,5(10),6,8-tetraen-17β-ol (75%, retention time 20.5 mins.) and 3-methoxyoestra-2,5(10),7-trien-17β-ol (10.5% retention time 16.5 min.).

EXAMPLE 14.—OESTRA-5(10),6,8-TRIEN-17β-OL AND β-METHOXYOESTRA-2,5(10),7-TRIEN-17β-OL

Ammonia (ca. 500 ml.) was distilled into a stirred solution of 3 - methoxyoestra - 1,3,5(10),6,8 - pentaen - 17β-ol (3.63 g.) in dry tetrahydrofuran (60 ml.) and dry t-butanol (45 ml.). Potassium (14.6 g.) was added in pieces and the mixture was stirred under reflux for 4 hrs. and then ethanol (200 ml.) was added. The ammonia was allowed to evaporate overnight and water (100 ml.) was added. The organic solvents were distilled off under reduced pressure and the steroid was filtered off and dried. Gas chromatography showed this product to contain several components including 3-methoxyoestra-2,5(10),7-trien-17β-ol (ca. 5%). The main component (ca. 55%) was isolated from a portion of the product by preparative thin-layer chromatography and shown to be oestra-5(10),6,8-trien-17β-ol, M.P. 146–147°, $[\alpha]_D$ +27.5°, $\lambda_{max.}$ 265, 278 mμ (ε 414, 348). Found: C, 84.3%; H, 9.1%. $C_{18}H_{24}O$ requires C, 84.3%; H, 9.45%.

EXAMPLE 15.—17α - HYDROXY - 3 - METHOXY-19 - NORPREGNA - 2,5(10),7 - TRIEN - 20 - ONE 20-ETHYLENE KETAL (a) 17α-hydroxy-3-methoxy-19-norpregna-1,3,5(10),8-pentaen-20-one 20-ethylene ketal 17α - hydroxy - 3 - methoxy - 19 - norpregna - 1,3,5(10),6,8-pentaen-20-one (2.0 g.) and toluene-p-sulphonic acid (40 mg.) were boiled under reflux at 110° in vacuo, with a nitrogen leak, for 1.75 hrs. The cooled suspension was poured into an excess of aqueous 2% sodium hydrogen carbonate (800 ml.) and the 20-ethylene ketal (2.2 g.), $\lambda_{max.}$ (in EtOH) 230 mμ, $$E_{1\,cm.}^{1\%} 1809$$

was collected by filtration and dried.

(b) 17α-hydroxy-3-methoxy-19-norpregna-2,5(10),7-trien-20-one 20-ethylene ketal

17α - hydroxy - 3 - methoxy - 19 - norpregna - 1,3,5-(10),6,8-penten-20-one 20-ethylene ketal (1.5 g.) in tetrahydrofuran (50 ml.) and t-butanol (40 ml.) was added to ammonia (ca. 150 ml.) which had been distilled from sodium. Lithium (2 g.) was added in small pieces to the stirred solution and the reaction mixture was stirred for 4.5 hrs. Ethanol (75 ml.) was added and the ammonia was allowed to evaporate overnight. The reaction mixture was concentrated to ca. 100 ml. in vacuo and diluted with water (600 ml.). The precipitated product (1.3 g.) was collected by filtration and crystallised from methanol-ether and then ether to give 17α-hydroxy-3-methoxy-19-norpregna-2,5(10),7-trien-20-one 20-ethylene ketal, (73 mg.) which showed bands for the 2-proton and the 7-proton (γ 4.70 and 5.33) in its proton magnetic resonance spectrum in deuterochloroform, relative to tetramethylsilane as standard (γ 10.0).

EXAMPLE 16.—19-NORERGOSTA-5(10),7,22-TRIEN-3-ONE-3-ETHYLENE KETAL (a) 19-norerogosta-5(10),6,8,22-tetraen-3-one 3-ethylene ketal 19 - norerogosta - 5(10),6,8,22 - tetraen - 3 - one (2 g.) was dissolved in benzene (200 ml.) and ethylene glycol (10 ml.); p-toluene sulphonic acid (800 mg.—dried) was added and the solution was boiled under reflux for 1 hr., using a water separator. The reaction mixture was poured into aqueous sodium hydrogen carbonate and the steroid was isolated with benzene. Crystallisation from methanol/ether gave 19-norergosta-5(10),6,8,22-tetraen-3-one 3-ethylene ketal (1.2 g.), M.P. 101–104°, $[\alpha]_D$ +31° (c., 1.0 in dioxan). Found: C, 82.1%; H, 9.9%. $C_{29}H_{42}O_2$ requires C, 82.4%; H, 10.0%.

(b) 19-norergosta-5(10),7,22-trien-3-one 3-ethylene ketal

A solution of 19-norergosta-5(10),6,8,22-tetraen-3-one 3-ethylene ketal (500 mg.) in dry tetrahydrofuran (15 ml.) and t-butanol (12 ml.) was added to ammonia (ca. 50 ml.) which had been distilled from sodium. Lithium (0.5 g.) was added and the mixture was stirred for 6 hrs.; ethanol was added to destroy the excess lithium and the ammonia was allowed to evaporate. Water was added and the steroid was isolated with ether. Crystallisation from methanol/ether gave 19-norergosta-5(10),7,22-trien-3-one 3-ethylene ketal (110 mg.), M.P. 93–95°, $[\alpha]_D$ +113° (c., 0.5 in dioxan).

We claim:

1. A process for the preparation of a 5(10),7-dehydro-steroid having the structure

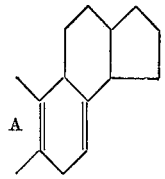

(I)

wherein A represents a divalent grouping selected from the group consisting of the structures

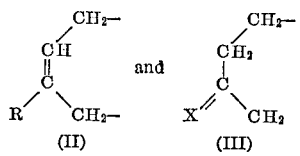

(II)    (III)

wherein R is a member selected from the group consisting of alkoxy of 1–5 carbon atoms, cycloalkoxy and tetrahydropyranyloxy and X is a member selected from the group consisting of a protected keto group, the grouping

and the grouping

wherein R has the meaning given above, which process comprises reacting a 5(10),6,8(9)-dehydro-steroid of the structure

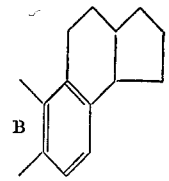

(IV)

wherein B represents a divalent grouping selected from the group consisting of the structure

(V)

wherein R has the meaning given above, the structure II and the structure III with a metal/ammonia reducing system in the presence of a substance liberating protons in liquid ammonia.

2. A process as claimed in claim 1 in which the metal/ammonia reducing system is a metal selected from the group consisting of an alkali metal and an alkaline earth metal in liquid ammonia.

3. A process as claimed in claim 2 in which the reducing system is lithium in liquid ammonia.

4. A process as claimed in claim 1 in which the substance providing protons in liquid ammonia is an alcohol.

5. A process as claimed in claim 4 in which the alcohol is a tertiary aliphatic alcohol.

6. A process as claimed in claim 1 in which there is present as solvent a member selected from the group consisting of a cyclic ether and an acyclic ether.

7. A process as claimed in claim 1 in which a starting compound of structure IV with B having structure II is prepared by reduction of a compound of structure IV with B having structure V with sodium in liquid ammonia followed by recovery of the required compound.

8. A process as claimed in claim 1 in which a starting compound of structure IV with B having structure III where X is a ketal group is obtained by reaction of the corresponding compound in which B has structure II with an alcohol in the presence of an acid catalyst.

9. A process as claimed in claim 8 in which the alcohol is a member selected from the group consisting of methanol, ethylene glycol and 1,2-propylene glycol.

10. A process as claimed in claim 1 in which a starting compound of structure IV with B having structure III where X is the grouping

is prepared by catalytic hydrogenation of the corresponding compound with B having structure II.

11. A process as claimed in claim 1 in which a starting compound of structure IV with B having the structure III where X is the grouping

is prepared by reduction of the corresponding compound of structure IV with B having the structure V with potassium in liquid ammonia, followed by recovery of the required compound.

12. A process as claimed in claim 1 in which the compound of structure IV carries a member selected from the group consisting of 17-oxo; 17-protected oxo; 17-hydroxy; 17-acyloxy; 17-acyl; 17-acyl,17-hydroxy; 17-acyl, 17-acyloxy; 17 - acetoxyacetyl; 17 - acetoxyacetyl,17-hydroxy; 17-acetoxyacetyl, 17-acyloxy; 17-aliphatic; 17-aliphatic,17-hydroxy; 17-aliphatic, 17-acyloxy; 17-araliphatic; 17-araliphatic,17-hydroxy; and 17-araliphatic,17-acyloxy.

13. A process as claimed in claim 12 in which said substituent is a hydrocarbon radical selected from the group consisting of methyl, ethyl, ethynyl, chloroethynyl and 5,6-dimethyl-hept-3-en-2-yl.

14. A process as claimed in claim 1 in which the compound of structure IV possesses a 13-alkyl group.

15. A process as claimed in claim 1 in which the compound of structure IV has a substituent R at the 3-position.

References Cited
UNITED STATES PATENTS 3,340,278  9/1967  Kruger.

ELBERT L. ROBERTS, *Primary Examiner.*

U.S. Cl. X.R.

260—397.5